US009893847B1

United States Patent
Liao et al.

(10) Patent No.: US 9,893,847 B1
(45) Date of Patent: Feb. 13, 2018

(54) WIRELESS COMMUNICATION DEVICE AND DIGITAL SELF-INTERFERENCE ESTIMATION METHOD THEREOF

(71) Applicant: Institute For Information Industry, Taipei (TW)

(72) Inventors: Yuan-Te Liao, New Taipei (TW); Terng-Yin Hsu, Hsinchu County (TW); You-Hsien Lin, Taipei (TW); Youn-Tai Lee, New Taipei (TW); Jian-Cheng Li, New Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 15/369,828

(22) Filed: Dec. 5, 2016

(30) Foreign Application Priority Data

Nov. 16, 2016 (TW) .............................. 105137458 A

(51) Int. Cl.
*H04L 5/00* (2006.01)
*H04L 1/24* (2006.01)
*H04L 5/14* (2006.01)

(52) U.S. Cl.
CPC ................ *H04L 1/248* (2013.01); *H04L 5/14* (2013.01)

(58) Field of Classification Search
CPC ..... H04L 5/1461; H04L 5/1423; H04B 1/525; H04B 1/56
USPC ......................................................... 375/227
See application file for complete search history.

(56) References Cited

U.S. PATENT DOCUMENTS

| 8,064,408 B2 * | 11/2011 | Woodsum | H04B 7/086 370/334 |
| 2002/0109631 A1 * | 8/2002 | Li | H01Q 3/2611 342/378 |
| 2011/0243202 A1 * | 10/2011 | Lakkis | H04B 1/525 375/219 |
| 2012/0063369 A1 * | 3/2012 | Lin | H04B 7/15542 370/279 |
| 2013/0286903 A1 * | 10/2013 | Khojastepour | H04L 5/14 370/280 |
| 2014/0348018 A1 * | 11/2014 | Bharadia | H04L 5/1461 370/252 |
| 2015/0043685 A1 * | 2/2015 | Choi | H04L 5/143 375/346 |
| 2015/0078217 A1 * | 3/2015 | Choi | H04L 5/14 370/278 |
| 2015/0139284 A1 * | 5/2015 | Choi | H04L 5/143 375/219 |

(Continued)

*Primary Examiner* — Daniel Washburn
*Assistant Examiner* — Berhanu Tadese
(74) *Attorney, Agent, or Firm* — Skaar Ulbrich Macari, P.A.

(57) ABSTRACT

A wireless communication device and a digital self-interference estimation method thereof are provided. The wireless communication device, at respective timings, receives a plurality of self-interference signals and generates a plurality of ideal transmitting signals. The wireless communication device calculates a signal adjusting vector based on the self-interference signals and the ideal transmitting signals at different timings. The wireless communication device generates a main ideal transmitting signal at a main timing, and calculates, based on the signal adjusting vector, a main self-interference signal corresponding to the main timing according to the received self-interference and the main ideal transmitting signal.

10 Claims, 6 Drawing Sheets

(56) References Cited

U.S. PATENT DOCUMENTS

| | | | |
|---|---|---|---|
| 2015/0171903 A1* | 6/2015 | Mehlman | H04B 1/10 375/346 |
| 2015/0180520 A1* | 6/2015 | Lima | H04L 25/0328 375/340 |
| 2015/0372799 A1* | 12/2015 | Moher | H04L 5/1461 370/249 |
| 2016/0105213 A1* | 4/2016 | Hua | H04B 1/525 370/278 |
| 2016/0112180 A1* | 4/2016 | Liao | H04L 5/1461 370/277 |
| 2016/0127114 A1* | 5/2016 | Kim | H04B 17/345 370/252 |
| 2016/0128050 A1* | 5/2016 | Sheu | H04W 4/02 370/329 |
| 2016/0143013 A1* | 5/2016 | Kim | H04B 17/345 370/329 |
| 2016/0183105 A1* | 6/2016 | Jiang | H04L 1/20 370/296 |
| 2016/0191228 A1* | 6/2016 | Chen | H04W 76/046 370/254 |
| 2016/0226653 A1* | 8/2016 | Bharadia | H04B 1/525 |
| 2016/0277063 A1* | 9/2016 | Liu | H04B 1/525 |
| 2016/0285486 A1* | 9/2016 | Qin | H04B 1/1027 |
| 2016/0323830 A1* | 11/2016 | Kim | H04W 72/082 |
| 2016/0329982 A1* | 11/2016 | Lim | H04B 1/58 |
| 2016/0359608 A1* | 12/2016 | Noh | H04L 5/1461 |
| 2017/0019218 A1* | 1/2017 | Sadeghi | H04L 5/001 |
| 2017/0019272 A1* | 1/2017 | Brannon | H04B 1/0475 |

\* cited by examiner

WIRELESS COMMUNICATION DEVICE AND DIGITAL SELF-INTERFERENCE ESTIMATION METHOD THEREOF

PRIORITY

This application claims priority to Taiwan Patent Application No. 105137458 filed on Nov. 16, 2016, which are hereby incorporated by reference in its entirety.

FIELD

The present invention relates to a wireless communication device and a digital self-interference estimation method thereof; and more particularly, the wireless communication device and the digital self-interference estimation method thereof according to the present invention adopt a linear dynamic model to estimate the self-interference.

BACKGROUND

In the conventional network environments, the Full-Duplex Radio (FDR) architecture allows for data transmissions at a same timing and at a same frequency as compared to Time-Division Duplex (TDD) and the Frequency-Division Duplex (FDD), so the FDR architecture has significantly higher transmission efficiency.

Because a single device transmits and receives data at a same timing and at a same frequency under the FDR network architecture, signals transmitted by the single device itself also causes signal interference to the device itself. To solve such a self-interference problem, linear digital self-interference estimation methods have been developed.

However, most of the linear digital self-interference estimation methods currently used adopt the Maximum Likelihood estimation algorithm, the main idea of which is to estimate an optimal solution of the self-interference signal through multiple rounds of operations and perform signal interference cancellation accordingly.

Unfortunately, such methods leads to a high operational complexity, and because they are only able to calculate the optimal solution of the self-interference signal roughly according to the overall network environment, it is impossible to determine a self-interference signal that better complies with the usage condition of the device by taking the signal memory problem possibly caused by the amplifier of the radio frequency (RF) circuit of the device into consideration.

Accordingly, efforts have to be made in the art to make an improvement on the shortcoming of self-interference signal estimation under the FDR architecture.

SUMMARY

The disclosure includes a digital self-interference estimation method for a wireless communication device. The wireless communication device is used in a Full Duplex Radio (FDR) network system. The digital self-interference estimation method can comprise: (a) enabling the wireless communication device to receive a first self-interference signal at a first timing; (b) enabling the wireless communication device to receive a second self-interference signal at a second timing and generate a first ideal transmitting signal; (c) enabling the wireless communication device to receive a third self-interference signal at a third timing and generate a second ideal transmitting signal; (d) enabling the wireless communication device to calculate a signal adjusting vector according to the first self-interference signal, the second self-interference signal, the third self-interference signal, the first ideal transmitting signal and the second ideal transmitting signal; and (e) enabling the wireless communication device to generate a third ideal transmitting signal at a fourth timing and calculate a fourth self-interference signal corresponding to the third self-interference signal and the third ideal transmitting signal based on the signal adjusting vector.

The disclosure also includes a wireless communication device for use in a Full Duplex Radio (FDR) network system, which comprises a transceiver and a processor. The transceiver can be configured to: receive a first self-interference signal at a first timing; receive a second self-interference signal at a second timing and generate a first ideal transmitting signal; and receive a third self-interference signal at a third timing and generate a second ideal transmitting signal. The processor is configured to: calculate a signal adjusting vector according to the first self-interference signal, the second self-interference signal, the third self-interference signal, the first ideal transmitting signal and the second ideal transmitting signal. The transceiver is further configured to generate a third ideal transmitting signal at a fourth timing. The processor is further configured to calculate a fourth self-interference signal corresponding to the third self-interference signal and the third ideal transmitting signal based on the signal adjusting vector.

The disclosure further includes a digital self-interference estimation method for a wireless communication device. The wireless communication device can be used in a Full Duplex Radio (FDR) network system, and the digital self-interference estimation method can comprise: (a) enabling the wireless communication device to, at a plurality of timings respectively, receive a plurality of self-interference signals and generate a plurality of ideal transmitting signals; (b) enabling the wireless communication device to create an M×M self-interference signal reference matrix $\Phi$ in the following form according to the self-interference signals and the ideal transmitting signals:

$$\begin{bmatrix} Y(1) & Y(2) & \ldots & Y(m-1) & X(m) \\ Y(2) & Y(3) & \ldots & Y(m) & X(m+1) \\ \vdots & \vdots & \ddots & \vdots & \vdots \\ Y(m-1) & Y(m) & \ldots & Y(2m-3) & X(2m-2) \\ Y(m) & Y(m+1) & \ldots & Y(2m-2) & X(2m-1) \end{bmatrix}$$

and create an M×1 self-interference signal matrix K in the following form according to the self-interference signals:

$$\begin{bmatrix} Y(m) \\ Y(m+1) \\ \vdots \\ Y(2m-2) \\ Y(2m-1) \end{bmatrix}$$

where, m is a positive integer greater than 1, Y(T) represents a self-interference signal received at a $T^{th}$ timing, and X(T) represents an ideal transmitting signal generated at the $T^{th}$ timing; (c) enabling the wireless communication device to calculate a signal adjusting vector matrix v according to the M×M self-interference signal reference matrix $\Phi$ and the M×1 self-interference signal matrix K, where, $v=(\Phi^T\Phi)^{-1}\Phi^T K$; and (d) enabling the wireless communication device to calculate an estimated interference signal at an $N^{th}$ timing according to the following formula:

$$Y(N,v)=[Y(N-(m-1)) \ldots Y(N-1)X(N)]\times v$$

where, $Y(N,v)$ is the estimated interference signal, $Y(T)$ represents a self-interference signal received at a $T^{th}$ timing, and $X(T)$ represents an ideal transmitting signal generated at the $T^{th}$ timing.

The disclosure additionally comprises a wireless communication device for use in a Full Duplex Radio (FDR) network system, which comprises a transceiver and a processor. The transceiver is configured to, at a plurality of timings respectively, receive a plurality of self-interference signals and generate a plurality of ideal transmitting signals. The processor is configured to: create an M×M self-interference signal reference matrix $\Phi$ in the following form according to the self-interference signals and the ideal transmitting signals:

$$\begin{bmatrix} Y(1) & Y(2) & \ldots & Y(m-1) & X(m) \\ Y(2) & Y(3) & \ldots & Y(m) & X(m+1) \\ \vdots & \vdots & \ddots & \vdots & \vdots \\ Y(m-1) & Y(m) & \ldots & Y(2m-3) & X(2m-2) \\ Y(m) & Y(m+1) & \ldots & Y(2m-2) & X(2m-1) \end{bmatrix}$$

and create an M×1 self-interference signal matrix K in the following form according to the self-interference signals:

$$\begin{bmatrix} Y(m) \\ Y(m+1) \\ \vdots \\ Y(2m-2) \\ Y(2m-1) \end{bmatrix}$$

where, m is a positive integer greater than 1, $Y(T)$ represents a self-interference signal received at a $T^{th}$ timing, and $X(T)$ represents an ideal transmitting signal generated at the $T^{th}$ timing. The processor is further configured to calculate a signal adjusting vector matrix v according to the M×M self-interference signal reference matrix $\Phi$ and the M×1 self-interference signal matrix K, where, $v=(\Phi^T\Phi)^{-1}\Phi^T K$, and calculate an estimated interference signal at an $N^{th}$ timing according to the following formula:

$$Y(N,v)=[Y(N-(m-1))) \ldots Y(N-1)X(N)]\times v$$

where, $Y(N,v)$ is the estimated interference signal, $Y(T)$ represents a self-interference signal received at a $T^{th}$ timing, and $X(T)$ represents an ideal transmitting signal generated at the $T^{th}$ timing.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. However, these example embodiments are not intended to limit the present invention to any particular examples, embodiments, environment, applications or implementations described in these example embodiments. Therefore, description of these example embodiments is only for purpose of illustration rather than to limit the present invention.

In the following embodiments and the attached drawings, elements unrelated to the present invention are omitted from depiction; and dimensional relationships among individual elements in the attached drawings are illustrated only for ease of understanding, but not to limit the actual scale.

Figure 1A:
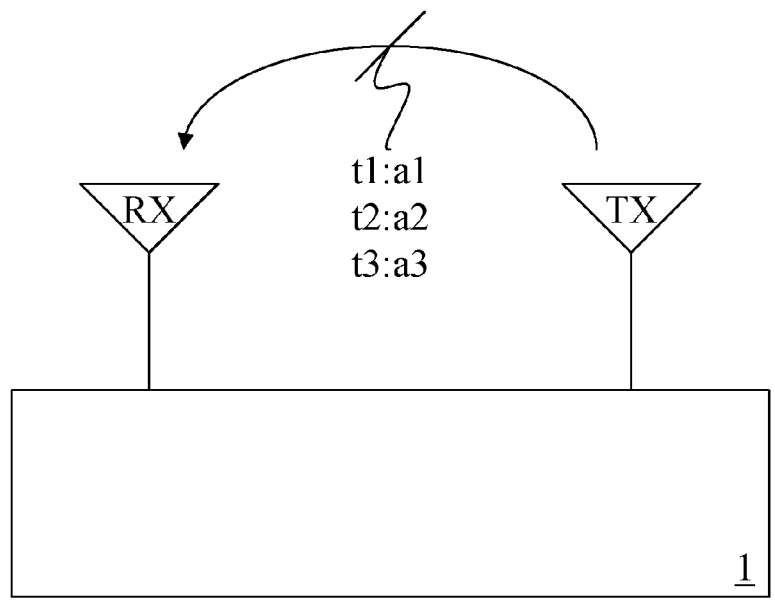
FIG. 1A is a schematic view illustrating operations of a wireless communication device according to a first embodiment of the present invention.
Figure 1B:
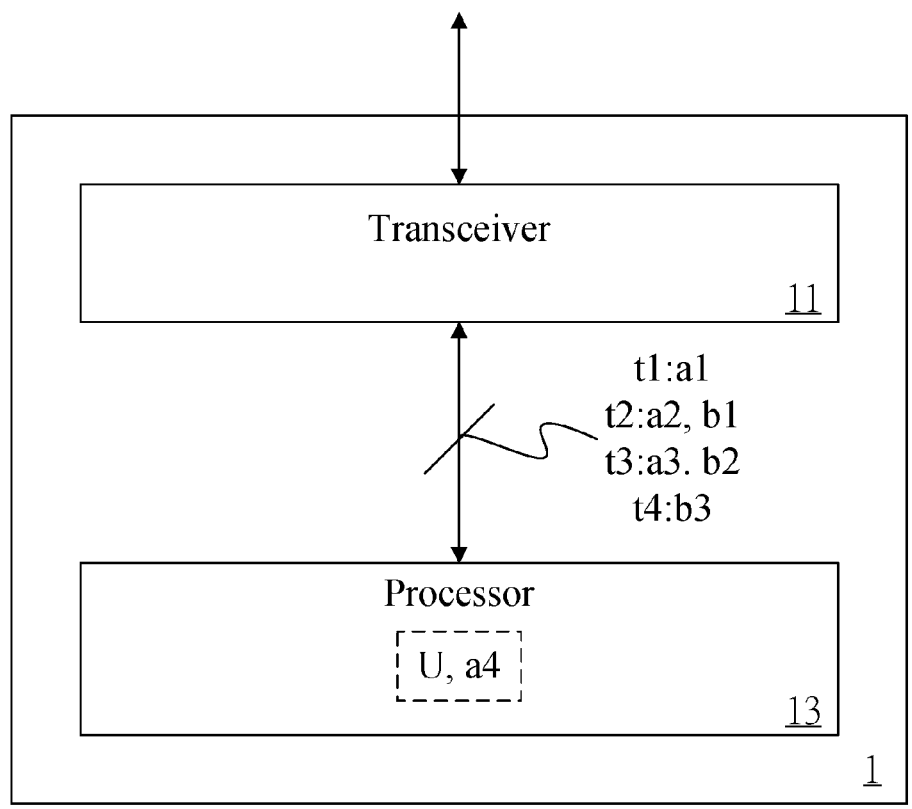
FIG. 1B is a block diagram of the wireless communication device according to the first embodiment of the present invention.

Please refer to FIGS. 1A and 1B. FIG. 1A is a schematic view illustrating operations of a wireless communication device 1 according to a first embodiment of the present invention. The wireless communication device 1 is used in a Full-Duplex Radio (FDR) network system. FIG. 1B is a block diagram of the wireless communication device 1 according to the first embodiment of the present invention. The wireless communication device 1 comprises a transceiver 11 (comprising a transmitting end TX and a receiving end RX) and a processor 13, and the transceiver 11 is electrically connected with the processor 13. Operation flows of the wireless communication device 1 will be further described hereinbelow.

Firstly when it is necessary to estimate the self-interference signal of a specific timing, the wireless communication device 1 needs to calculate an associated adjusting parameter according to a previously received self-interference signal. In detail, the transceiver 11 of the wireless communication device 1 performs the following operations: (1) receiving a first self-interference signal a1 at a first timing t1; (b) receiving a second self-interference signal a2 at a second timing t2 and generate a first ideal transmitting signal b1; (c) receiving a third self-interference signal a3 at a third timing t3 and generate a second ideal transmitting signal b2.

It shall be particularly noted that, the present invention mainly focuses on use of self-interference signals, and because people skilled in the art can readily understand that the self-interference signal is transmitted by the device itself, the process of transmitting the self-interference signal will not be further described. Also, people skilled in the art shall understand that, the ideal transmitting signal described above is a signal to be transmitted by the device itself and not subjected to any interference, and because the present invention focuses on use of the ideal transmitting signal, this will not be further described either.

Then, the processor 13 of the wireless communication device 1 calculates a signal adjusting vector U according to the first self-interference signal a1, the second self-interference signal a2, the third self-interference signal a3, the first ideal transmitting signal b1 and the second ideal transmitting signal b2. Here, the signal adjusting vector U is mainly used to estimate a self-interference signal of a subsequent timing.

Further speaking, when the transceiver 11 of the wireless communication device 1 generates a third ideal transmitting signal b3 at a fourth timing t4, the processor 13 may calculate a fourth self-interference signal a4 corresponding to the third self-interference signal b3 and the third ideal transmitting signal b3 according to the signal adjusting vector U so as to be used in subsequent interference cancellation. The operation process will be described with reference to an exemplary example to facilitate better understanding of the technical concept of the present invention.

For example, in the first embodiment, the wireless communication device 1 mainly uses the following relationships to determine the signal adjusting vector U after receiving the associated self-interference signals and generating the associated ideal transmitting signals:

(1) the second self-interference signal a2 is a product of a matrix, which is formed by the first self-interference signal a1 and the first ideal signal b1, and the signal adjusting vector U; and (2) the third self-interference signal a3 is a product of a matrix, which is formed by the second self-interference signal a2 and the second ideal signal b2, and the signal adjusting vector U.

In detail, if the matrix formed by the first self-interference signal a1 at the first timing t1 and the first ideal transmitting signal b1 at the second timing t2 is represented as [a1 b1] and the signal adjusting vector U is represented as $$\begin{bmatrix} \alpha \\ \beta \end{bmatrix},$$

then the second interference signal a2 may be represented in a linear form as a2=α×a1+β×b1.

Similarly, if the matrix formed by the second self-interference signal a2 at the second timing t2 and the second ideal transmitting signal b2 at the third timing t3 is represented as [a2 b2] and the signal adjusting vector U is represented as $$\begin{bmatrix} \alpha \\ \beta \end{bmatrix},$$

then the third interference signal a3 may be represented in a linear form as a3=α×a2+β×b2.

Accordingly, given that the first self-interference signal a1, the second self-interference signal a2, the third self-interference signal a3, the first ideal transmitting signal b1 and the second ideal transmitting signal b2 are all known, the actual value of the signal adjusting vector U (i.e., $$\begin{bmatrix} \alpha \\ \beta \end{bmatrix})$$

can be derived through a matrix operation and the subsequent self-interference signal can be estimated through the aforesaid linear operation.

More specifically, when the third ideal transmitting signal b3 is generated by the wireless communication device 1 at the fourth timing t4, the fourth self-interference signal a4 can be calculated in the linear form as a4=α×a3+β×b3 according to known values of the third self-interference signal a3, the third ideal transmitting signal b3 and the signal adjusting vector U.

Then when a remote device signal (not shown) transmitted by a remote device (not shown) is received by the transceiver 111 of the wireless communication device 1 at the fourth timing t4, the processor 13 of the wireless communication device 1 can cancel the fourth self-interference signal a4 with the remote device signal to generate an interference cancellation signal corresponding to the remote device signal.

It shall be particularly noted that, the main meaning of the aforesaid linear formula may be summarized as: (a self-interference signal at a timing t)=α×(a self-interference signal at a timing (t−1))+β×(an ideal transmitting signal at the timing t). Obviously, the self-interference signal at a subsequent timing can be calculated through the linear operation according to the ideal transmitting signal at the same timing and a self-interference signal at a previous timing once the signal adjusting vector in the formula (i.e., α and β) are derived.

Thereby, the subsequent self-interference signal can be calculated through a single linear operation without the need of complex operations once the estimation model (i.e., a formula and parameters thereof) of the present invention has been created, and because reference is made to the self-interference signal of the previous timing in calculation of the self-interference signal, the signal memory effect possibly caused by the amplifier can be taken into consideration in the linear model.

Figure 2A:
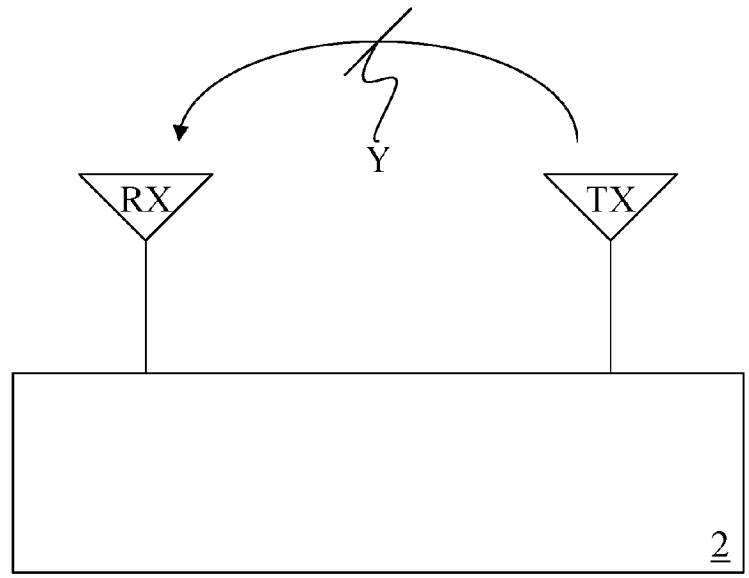
FIG. 2A is a schematic view illustrating operations of a wireless communication device according to a second embodiment of the present invention.
Figure 2B:
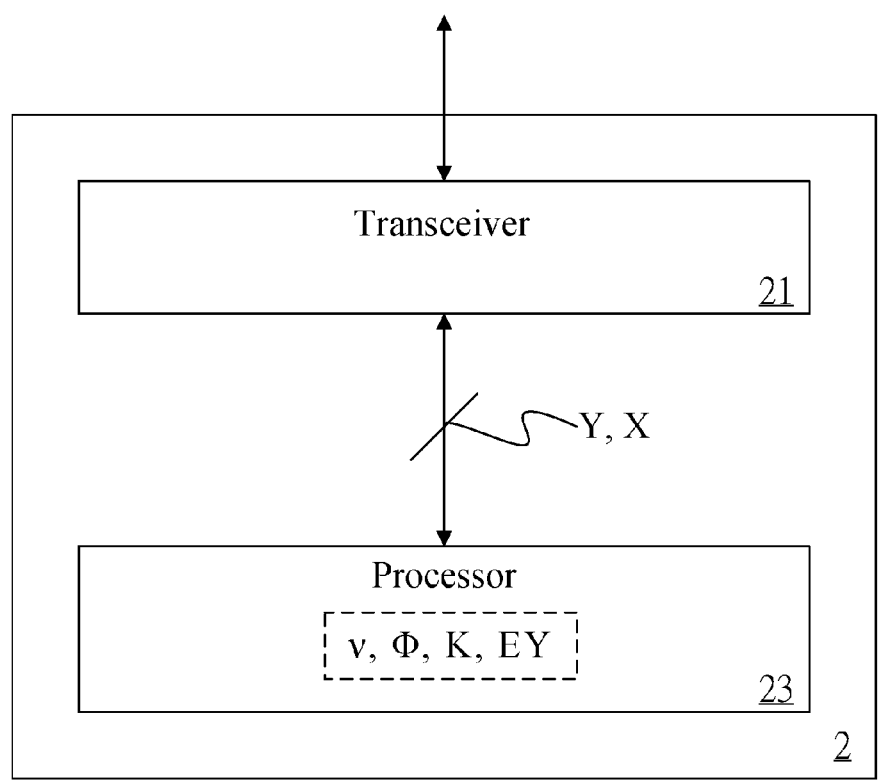
FIG. 2B is a block diagram of the wireless communication device according to the second embodiment of the present invention.

Please refer to FIGS. 2A and 2B. FIG. 2A is a schematic view illustrating operations of a wireless communication device 2 according to a second embodiment of the present invention. The wireless communication device 2 is used in an FDR network system. FIG. 2B is a block diagram of the wireless communication device 2 according to the second embodiment of the present invention. The wireless communication device 2 comprises a transceiver 21 (comprising a transmitting end TX and a receiving end RX) and a processor 23, and the transceiver 21 is electrically connected with the processor 23. The second embodiment is mainly intended to further describe how to estimate the self-interference signal at a specific timing according to the already received self-interference signals and the ideal transmitting signal.

Firstly, the transceiver 21 of the wireless communication device 2 receives a plurality of self-interference signals Y at a plurality of timings respectively and generates a plurality of ideal transmitting signals X. Then the processor 23 of the wireless communication device 2 creates an M×M self-interference signal reference matrix Φ in the following form according to the self-interference signals Y and the ideal transmitting signals X:

$$\begin{bmatrix} Y(1) & Y(2) & \ldots & Y(m-1) & X(m) \\ Y(2) & Y(3) & \ldots & Y(m) & X(m+1) \\ \vdots & \vdots & \ddots & \vdots & \vdots \\ Y(m-1) & Y(m) & \ldots & Y(2m-3) & X(2m-2) \\ Y(m) & Y(m+1) & \ldots & Y(2m-2) & X(2m-1) \end{bmatrix}$$

and creates an M×1 self-interference signal matrix K in the following form according to the self-interference signals Y:

$$\begin{bmatrix} Y(m) \\ Y(m+1) \\ \vdots \\ Y(2m-2) \\ Y(2m-1) \end{bmatrix}$$

More specifically, m is a positive integer greater than 1, Y(T) represents a self-interference signal received at a $T^{th}$ timing, and X(T) represents an ideal transmitting signal generated at the $T^{th}$ timing. Next, the processor 23 of the wireless communication device 2 calculates a signal adjusting vector matrix v according to the M×M self-interference signal reference matrix Φ and the M×1 self-interference signal matrix K, where, $v=(\Phi^T\Phi)^{-1}\Phi^T K$.

Subsequently, the processor 23 of the wireless communication device 2 calculates an estimated interference signal EY at an $N^{th}$ timing according to the following formula:

$$Y(N,v)=[Y(N-(m-1)) \ldots Y(N-1)X(N)] \times v$$

where, Y(N,v) is the estimated interference signal EY, Y(T) represents a self-interference signal Y received at a $T^{th}$ timing, and X(T) represents an ideal transmitting signal X generated at the $T^{th}$ timing.

The linear formula described above in the present invention may be summarized as:

$$Y(T) = \left[\sum_{i=1}^{m-1} \alpha_i \times Y(T-i)\right] + \beta \times X(T)$$

where, the signal adjusting vector matrix v is $[\alpha_{m-1}\ \alpha_{m-2}\ \ldots\ \alpha_1 \beta]^T$, so obviously $K=\Phi \times v$.

In other words, the aforesaid operation derives the signal adjusting vector matrix v directly through a matrix operation according to the matrix Φ formed by the already received self-interference signals Y and the already generated ideal transmitting signals X and the matrix K so as to facilitate calculating an estimated self-interference signal of the corresponding timing directly through the following linear formula:

$$Y(T) = \left[\sum_{i=1}^{m-1} \alpha_i \times Y(T-i)\right] + \beta \times X(T).$$

Then when a remote device signal (not shown) transmitted by a remote device (not shown) is received by the transceiver 21 of the wireless communication device 2 at the $N^{th}$ timing, the processor 23 can cancel the estimated self-interference signal EY with the remote device signal to generate an interference cancellation signal corresponding to the remote device signal.

It shall be additionally noted that, the value of m may be a value determined by the user, and the value thereof determines the number of elements of the signal adjusting vector matrix v and also has an influence on the linear regression accuracy of the linear formula $$Y(T) = \left[\sum_{i=1}^{m-1} \alpha_i \times Y(T-i)\right] + \beta \times X(T).$$

Hereinbelow, the value of m and the aforesaid operations will be described with reference to a simple exemplary example.

Specifically in an implementation, the transceiver 21 of the wireless communication device 2 receives a plurality of self-interference signals Y(1)~Y(5) at a plurality of timings respectively and generates a plurality of ideal transmitting signals X(3)~(X5). If the value of m is 3, then the self-interference signal reference matrix Φ has a size of 3×3 and has the following contents:

$$\begin{bmatrix} Y(1) & Y(2) & X(3) \\ Y(2) & Y(3) & X(4) \\ Y(3) & Y(4) & X(5) \end{bmatrix}$$

and the self-interference signal matrix K has a size of 3×1 and has the following contents:

$$\begin{bmatrix} Y(3) \\ Y(4) \\ Y(5) \end{bmatrix}.$$

Next, the processor 23 of the wireless communication device 2 calculates a signal adjusting vector matrix v according to the 3×3 self-interference signal reference matrix Φ and the 3×1 self-interference signal matrix K via formula $v=(\Phi^T\Phi)^{-1}\Phi^T K$. The signal adjusting vector matrix v has a size of 3×1 and has the following contents:

$$\begin{bmatrix} \alpha_2 \\ \alpha_1 \\ \beta \end{bmatrix}.$$

Then when it is necessary to calculate an estimated self-interference signal at a sixth timing, the transceiver 21 of the wireless communication device 2 generates an ideal transmitting signal X(6) first. Given that values of Y(5), Y(4) and X(6) are already known and the contents of the signal adjusting vector matrix v have been derived previously, $Y(6)=\alpha_1 \times Y(5)+\alpha_2 \times Y(4)+\beta \times X(6)$ can be directly obtained according to the linear formula $$Y(T) = \left[\sum_{i=1}^{m-1} \alpha_i \times Y(T-i)\right] + \beta \times X(T).$$

As another example, in another implementation, the transceiver 21 of the wireless communication device 2 receives a plurality of self-interference signals Y(1)~Y(7) at a plurality of timings respectively and generates a plurality of ideal transmitting signals X(4)~(X7). If the value of m is 4, then the self-interference signal reference matrix Φ has a size of 4×4 and has the following contents:

$$\begin{bmatrix} Y(1) & Y(2) & Y(3) & X(4) \\ Y(2) & Y(3) & Y(4) & X(5) \\ Y(3) & Y(4) & Y(5) & X(6) \\ Y(4) & Y(5) & Y(6) & X(7) \end{bmatrix}$$

and the self-interference signal matrix K has a size of 4×1 and has the following contents:

$$\begin{bmatrix} Y(4) \\ Y(5) \\ Y(6) \\ Y(7) \end{bmatrix}.$$

Next, the processor 23 of the wireless communication device 2 calculates a signal adjusting vector matrix v according to the 4×4 self-interference signal reference matrix Φ and the 4×1 self-interference signal matrix K via formula $v=(\Phi^T\Phi)^{-1}\Phi^T K$. The signal adjusting vector matrix v has a size of 4×1 and has the following contents:

$$\begin{bmatrix} \alpha_3 \\ \alpha_2 \\ \alpha_1 \\ \beta \end{bmatrix}.$$

Then when it is necessary to calculate an estimated self-interference signal at an eighth timing, the transceiver 21 of the wireless communication device 2 generates an ideal transmitting signal X(8) first. Given that values of Y(6), Y(5), Y(4) and X(7) are already known and the contents of the signal adjusting vector matrix v have been derived previously, $Y(8)=\alpha_1 \times Y(7)+\alpha_2 \times Y(6)+\alpha_3 \times Y(5)+\beta \times X(8)$ can be directly obtained according to the linear formula.

It shall be particularly noted that, the aforesaid timings are relative but not absolute. Further speaking, the first timing is not the first time point at which the wireless communication device initiates the transceiving operation after being powered on, but is a first time point of a certain period. The above descriptions of the present invention are mainly used for description, and estimation of the self-interference at a specific timing shall make reference to the ideal transmitting signal and self-interference signals of several previous timings. Therefore, use of the aforesaid timing is not intended to limit the present invention.

Thus, the user may determine the value of m according to the network environment and the hardware configuration, and once the value of m is fixed, an estimation model (i.e., a formula and parameters thereof) can be created. Similarly, a subsequent self-interference signal can be obtained through a single linear operation, and because calculation of the self-interference signal makes reference to the self-interference signals of several previous timings, the signal memory effect possibly caused by the amplifier can be taken into consideration in the linear model.

It shall also be noted that, the aforesaid wireless communication device of the present invention may be a wireless mobile station or a wireless base station having the FDR function, and the transceiver and the processor may be formed of an RF circuit, a processor circuit or corresponding hardware circuits thereof in combination.

Figure 3:
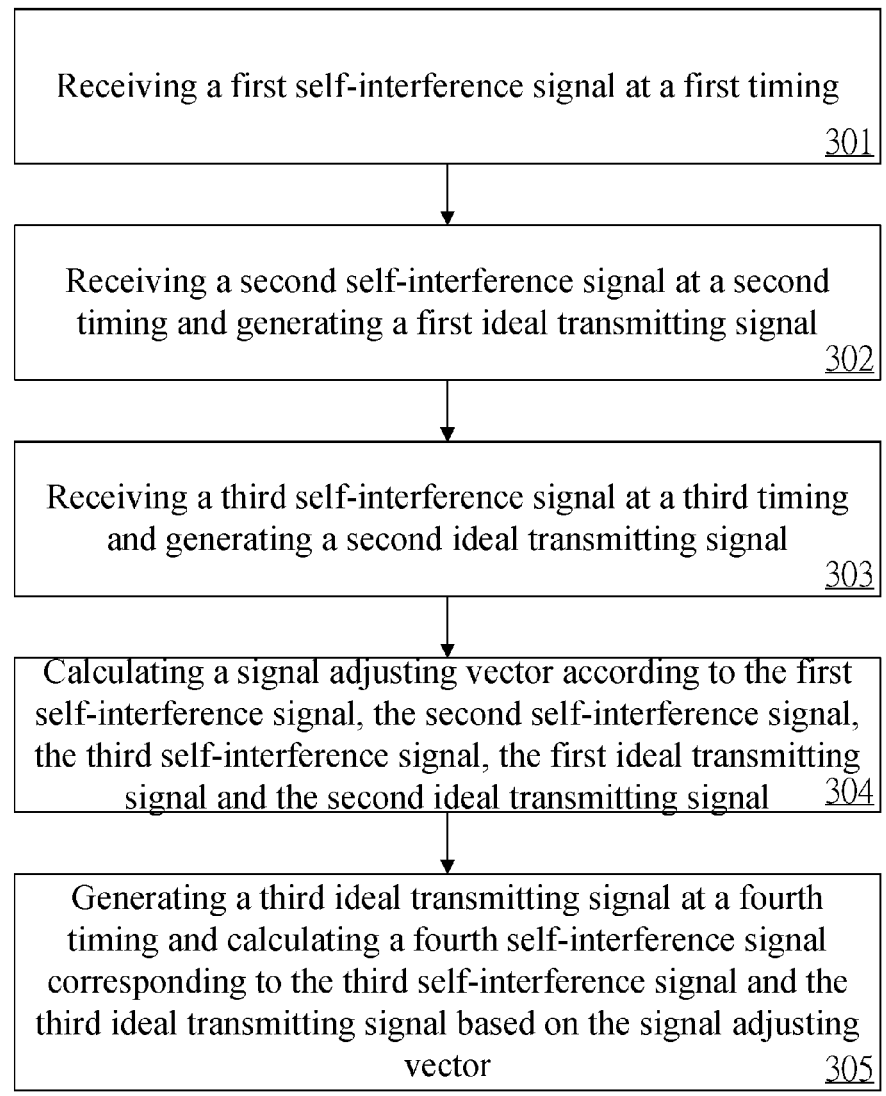
FIG. 3 is a flowchart diagram of a digital self-interference estimation method according to a third embodiment of the present invention.

A third embodiment of the present invention is a digital self-interference estimation method, a flowchart diagram of which is shown in FIG. 3. The method of the third embodiment is used in a wireless communication device (e.g., the wireless communication device 1 of the aforesaid embodiment). The wireless communication device is used in an FDR network system. Detailed steps of the third embodiment are as follows.

First, step 301 is executed to enable the wireless communication device to receive a first self-interference signal at a first timing. Step 302 is executed to enable the wireless communication device to receive a second self-interference signal at a second timing and generate a first ideal transmitting signal. Step 303 is executed to enable the wireless communication device to receive a third self-interference signal at a third timing and generate a second ideal transmitting signal.

Then step 304 is executed to enable the wireless communication device to calculate a signal adjusting vector according to the first self-interference signal, the second self-interference signal, the third self-interference signal, the first ideal transmitting signal and the second ideal transmitting signal. Step 305 is executed to enable the wireless communication device to generate a third ideal transmitting signal at a fourth timing and calculate a fourth self-interference signal corresponding to the third self-interference signal and the third ideal transmitting signal based on the signal adjusting vector.

Figure 4:
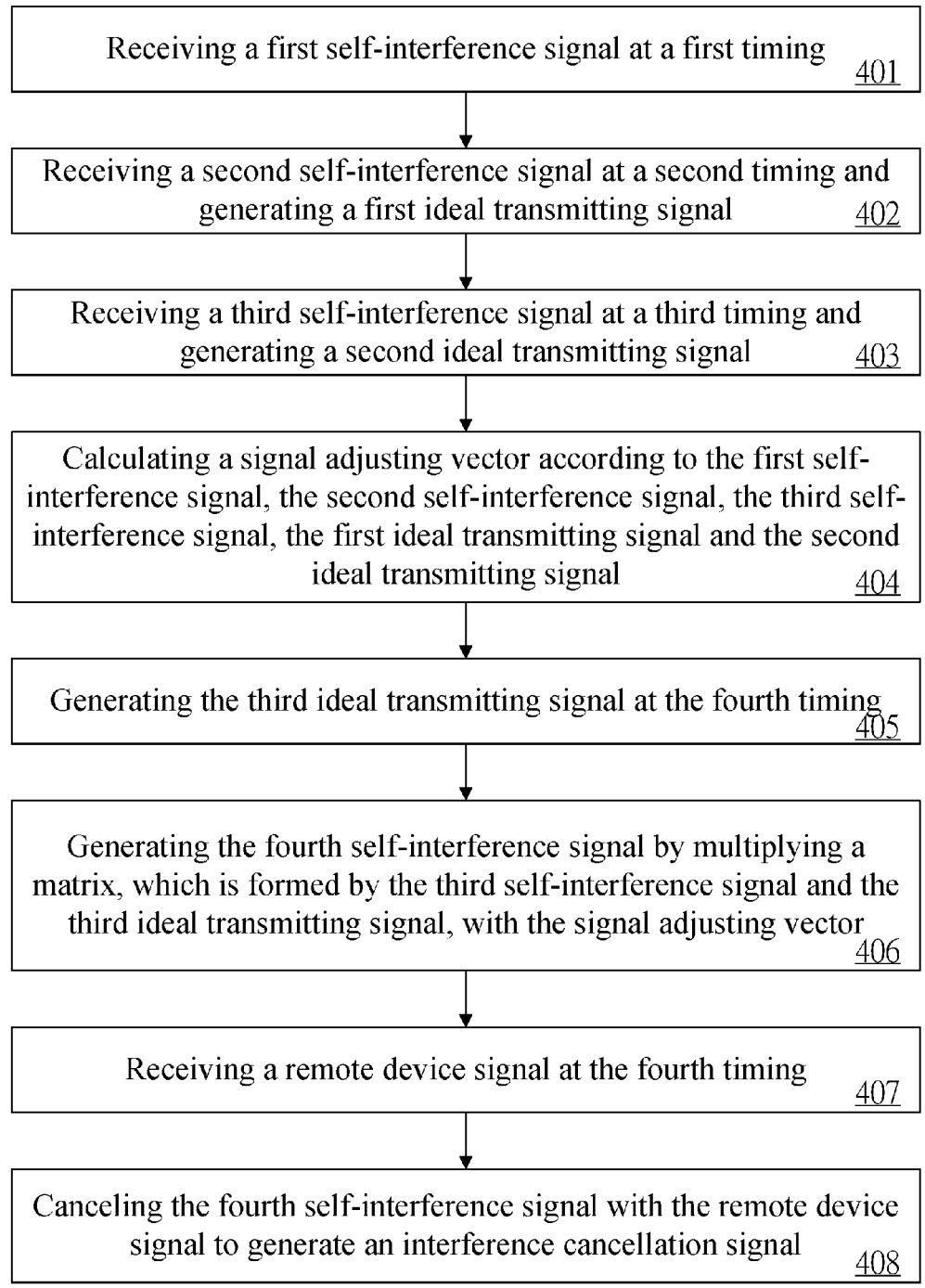
FIG. 4 is a flowchart diagram of a digital self-interference estimation method according to a fourth embodiment of the present invention.

A fourth embodiment of the present invention is a digital self-interference estimation method, a flowchart diagram of which is shown in FIG. 4. The method of the fourth embodiment is used in a wireless communication device (e.g., the wireless communication device 1 of the aforesaid embodiment). The wireless communication device is used in an FDR network system. Detailed steps of the fourth embodiment are as follows.

First, step 401 is executed to enable the wireless communication device to receive a first self-interference signal at a first timing. Step 402 is executed to enable the wireless communication device to receive a second self-interference signal at a second timing and generate a first ideal transmitting signal. Step 403 is executed to enable the wireless communication device to receive a third self-interference signal at a third timing and generate a second ideal transmitting signal.

Then step 404 is executed to enable the wireless communication device to calculate a signal adjusting vector according to the first self-interference signal, the second self-interference signal, the third self-interference signal, the first ideal transmitting signal and the second ideal transmitting signal. The calculation is based on that: the second self-interference signal is a product of a matrix, which is formed by the first self-interference signal and the first ideal transmitting signal, and the signal adjusting vector, and the third self-interference signal is a product of a matrix, which is formed by the second self-interference signal and the second ideal transmitting signal, and the signal adjusting vector.

Then step 405 is executed to enable the wireless communication device to generate a third ideal transmitting signal at the fourth timing. Step 406 is executed to enable the wireless communication device to generate a fourth self-interference signal by multiplying a matrix, which is formed by the third self-interference signal and the third ideal transmitting signal, with the signal adjusting vector. Step 407 is executed to enable the wireless communication device to receive a remote device signal at the fourth timing Finally step 408 is executed to enable the wireless communication device to cancel the fourth self-interference signal with the remote device signal to generate an interference cancellation signal.

Figure 5:
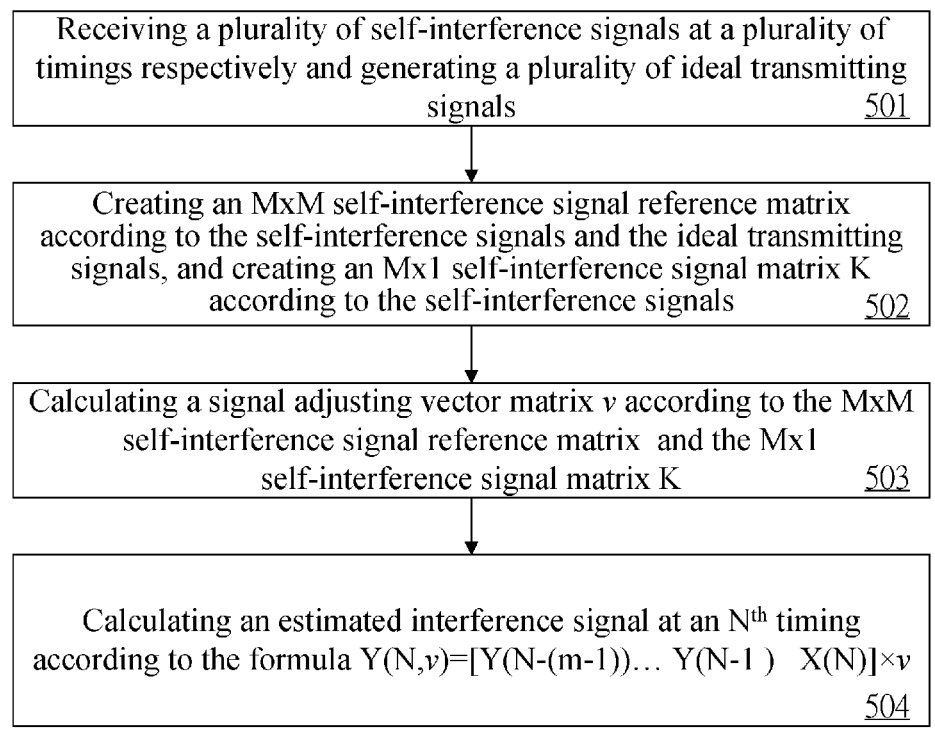
FIG. 5 is a flowchart diagram of a digital self-interference estimation method according to a fifth embodiment of the present invention.

A fifth embodiment of the present invention is a digital self-interference estimation method, a flowchart diagram of which is shown in FIG. 5. The method of the fifth embodiment is used in a wireless communication device (e.g., the wireless communication device 2 of the aforesaid embodiment). The wireless communication device is used in an FDR network system. Detailed steps of the fifth embodiment are as follows.

First, step 501 is executed to enable the wireless communication device to, at a plurality of timings respectively, receive a plurality of self-interference signals and generate a plurality of ideal transmitting signals. Step 502 is executed to enable the wireless communication device to create an M×M self-interference signal reference matrix Φ in the following form according to the self-interference signals and the ideal transmitting signals:

$$\begin{bmatrix} Y(1) & Y(2) & \ldots & Y(m-1) & X(m) \\ Y(2) & Y(3) & \ldots & Y(m) & X(m+1) \\ \vdots & \vdots & \ddots & \vdots & \vdots \\ Y(m-1) & Y(m) & \ldots & Y(2m-3) & X(2m-2) \\ Y(m) & Y(m+1) & \ldots & Y(2m-2) & X(2m-1) \end{bmatrix}$$

and create an M×1 self-interference signal matrix K in the following form according to the self-interference signals:

$$\begin{bmatrix} Y(m) \\ Y(m+1) \\ \vdots \\ Y(2m-2) \\ Y(2m-1) \end{bmatrix}$$

where, m is a positive integer greater than 1, Y(T) represents a self-interference signal received at a $T^{th}$ timing, and X(T) represents an ideal transmitting signal generated at the $T^{th}$ timing.

Next, step 503 is executed to enable the wireless communication device to calculate a signal adjusting vector matrix v according to the M×M self-interference signal reference matrix Φ and the M×1 self-interference signal matrix K, where, $v=(\Phi^T\Phi)^{-1}\Phi^T K$. Step 504 is executed to enable the wireless communication device to calculate an estimated interference signal at an $N^{th}$ timing according to the following formula:

$$Y(N,v)=[Y(N-(m-1)) \ldots Y(N-1)X(N)] \times v$$

where, Y(N,v) is the estimated interference signal, Y(T) represents a self-interference signal received at a $T^{th}$ timing, and X(T) represents an ideal transmitting signal generated at the $T^{th}$ timing.

Figure 6:
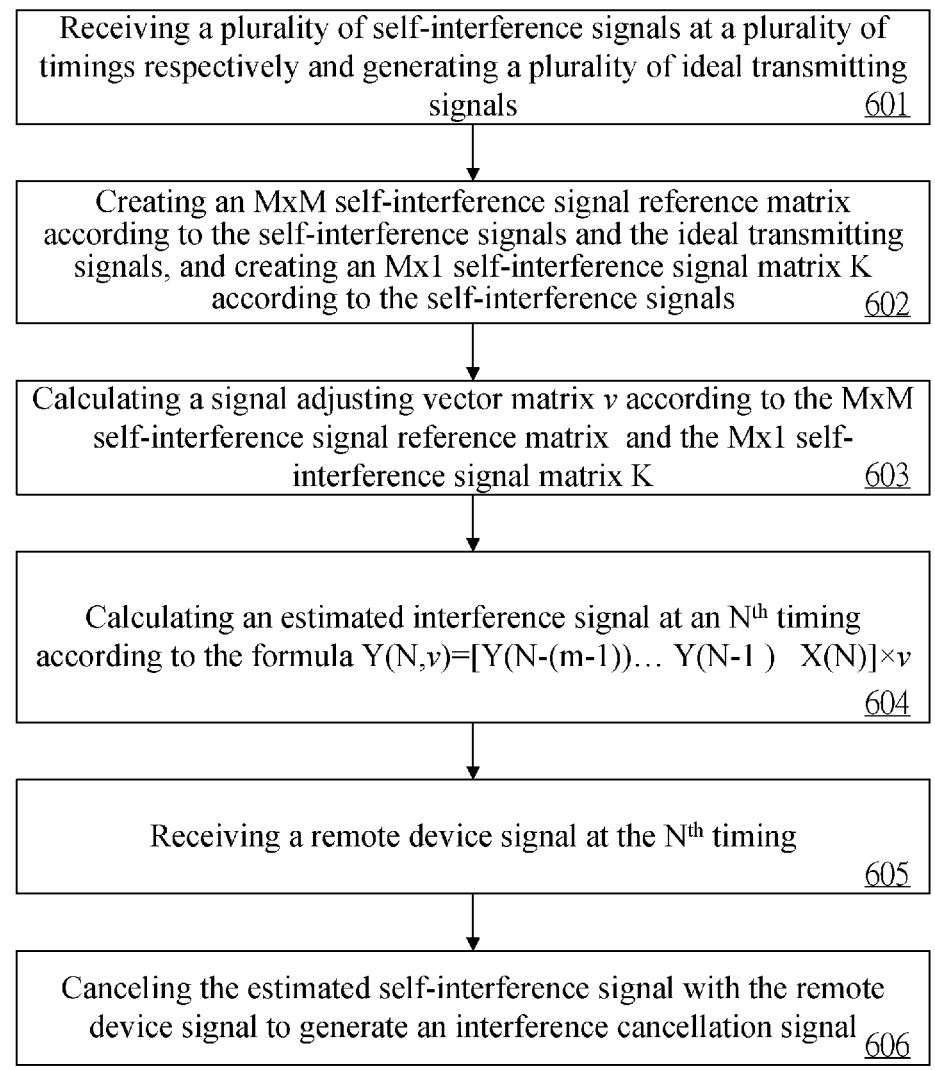
FIG. 6 is a flowchart diagram of a digital self-interference estimation method according to a sixth embodiment of the present invention.

A sixth embodiment of the present invention is a digital self-interference estimation method, a flowchart diagram of which is shown in FIG. 6. The method of the sixth embodiment is used in a wireless communication device (e.g., the wireless communication device 2 of the aforesaid embodiment). The wireless communication device is used in an FDR network system. Detailed steps of the sixth embodiment are as follows.

First, step 601 is executed to enable the wireless communication device to, at a plurality of timings respectively, receive a plurality of self-interference signals and generate a plurality of ideal transmitting signals. Step 602 is executed to enable the wireless communication device to create an M×M self-interference signal reference matrix Φ in the following form according to the self-interference signals and the ideal transmitting signals:

$$\begin{bmatrix} Y(1) & Y(2) & \ldots & Y(m-1) & X(m) \\ Y(2) & Y(3) & \ldots & Y(m) & X(m+1) \\ \vdots & \vdots & \ddots & \vdots & \vdots \\ Y(m-1) & Y(m) & \ldots & Y(2m-3) & X(2m-2) \\ Y(m) & Y(m+1) & \ldots & Y(2m-2) & X(2m-1) \end{bmatrix}$$

and create an M×1 self-interference signal matrix K in the following form according to the self-interference signals:

$$\begin{bmatrix} Y(m) \\ Y(m+1) \\ \vdots \\ Y(2m-2) \\ Y(2m-1) \end{bmatrix}$$

where, m is a positive integer greater than 1, Y(T) represents a self-interference signal received at a $T^{th}$ timing, and X(T) represents an ideal transmitting signal generated at the $T^{th}$ timing.

Next, step 603 is executed to enable the wireless communication device to calculate a signal adjusting vector matrix v according to the M×M self-interference signal reference matrix Φ and the M×1 self-interference signal matrix K, where, $v=(\Phi^T\Phi)^{-1}\Phi^T K$. Step 604 is executed to enable the wireless communication device to calculate an estimated interference signal at an $N^{th}$ timing according to the following formula:

$$Y(N,v)=[Y(N-(m-1)) \ldots Y(N-1)X(N)] \times v$$

where, Y(N,v) is the estimated interference signal, Y(T) represents a self-interference signal received at a $T^{th}$ timing, and X(T) represents an ideal transmitting signal generated at the $T^{th}$ timing.

Then step 605 is executed to enable the wireless communication device to receive a remote device signal at an $N^{th}$ timing. Finally step 606 is executed to enable the wireless communication device to cancel the estimated self-interference signal with the remote device signal to generate an interference cancellation signal.

According to the above descriptions, the wireless communication devices and the digital self-interference estimation method thereof according to the present invention can use the already received self-interference signals and the already generated ideal transmitting signal to create a linear model for estimation (i.e., a formula and parameters thereof), so the subsequent self-interference signal can be calculated through a single linear operation without the need of complex operations, and because reference is made to the self-interference signal of the previous timing in calculation of the self-interference signal, the signal memory effect possibly caused by the amplifier can be taken into consideration in the linear model. Thereby, the shortcoming of the prior art can be effectively improved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A digital self-interference estimation method for a wireless communication device, the wireless communication device being used in a Full Duplex Radio (FDR) network system, the digital self-interference estimation method comprising:
   (a) the wireless communication device receiving a first self-interference signal at a first timing;
   (b) the wireless communication device receiving a second self-interference signal at a second timing and generate a first ideal transmitting signal;
   (c) the wireless communication device receiving a third self-interference signal at a third timing and generate a second ideal transmitting signal;
   (d) the wireless communication device calculating a signal adjusting vector according to the first self-interference signal, the second self-interference signal, the third self-interference signal, the first ideal transmitting signal and the second ideal transmitting signal;
   (e) the wireless communication device generating a third ideal transmitting signal and receiving a remote device signal at a fourth timing and calculating a fourth self-interference signal corresponding to the third self-interference signal and the third ideal transmitting signal based on the signal adjusting vector; and
   (f) the wireless communication device cancelling the fourth self-interference signal with the remote device signal to generate an interference cancellation signal.

2. The digital self-interference estimation method according to claim 1, wherein the second self-interference signal is a product of a matrix, which is formed by the first self-interference signal and the first ideal transmitting signal, and the signal adjusting vector, and the third self-interference signal is a product of a matrix, which is formed by the second self-interference signal and the second ideal transmitting signal, and the signal adjusting vector.

3. The digital self-interference estimation method according to claim 1, wherein the step (e) further comprises:
   (e1) the wireless communication device generating the third ideal transmitting signal at the fourth timing; and
   (e2) the wireless communication device generating the fourth self-interference signal by multiplying a matrix, which is formed by the third self-interference signal and the third ideal transmitting signal, with the signal adjusting vector.

4. A digital self-interference estimation method for a wireless communication device, the wireless communication device being used in a Full Duplex Radio (FDR) network system, the digital self-interference estimation method comprising:
   (a) the wireless communication device, at a plurality of timings respectively, receiving a plurality of self-interference signals and generate a plurality of ideal transmitting signals;
   (b) the wireless communication device creating an M×M self-interference signal reference matrix Φ in the following form according to the self-interference signals and the ideal transmitting signals:

$$\begin{bmatrix} Y(1) & Y(2) & \ldots & Y(m-1) & X(m) \\ Y(2) & Y(3) & \ldots & Y(m) & X(m+1) \\ \vdots & \vdots & \ddots & \vdots & \vdots \\ Y(m-1) & Y(m) & \ldots & Y(2m-3) & X(2m-2) \\ Y(m) & Y(m+1) & \ldots & Y(2m-2) & X(2m-1) \end{bmatrix}$$

and create an M×1 self-interference signal matrix K in the following form according to the self-interference signals:

$$\begin{bmatrix} Y(m) \\ Y(m+1) \\ \vdots \\ Y(2m-2) \\ Y(2m-1) \end{bmatrix}$$

where, m is a positive integer greater than 1, Y(T) represents a self-interference signal received at a $T^{th}$ timing, and X(T) represents an ideal transmitting signal generated at the $T^{th}$ timing;
   (c) the wireless communication device calculating a signal adjusting vector matrix v according to the M×M self-interference signal reference matrix Φ and the M×1 self-interference signal matrix K,
   where, $v=(\Phi^T\Phi)^{-1}\Phi^T K$;
   (d) the wireless communication device calculating an estimated interference signal at an $N^{th}$ timing according to the following formula:

$$Y(N,v)=[Y(N-(m-1)) \ldots Y(N-1)X(N)]\times v$$

where, Y(N,v) is the estimated interference signal, Y(T) represents a self-interference signal received at a $T^{th}$ timing, and X(T) represents an ideal transmitting signal generated at the $T^{th}$ timing.

5. The digital self-interference estimation method according to claim 4, further comprising:
   (e) the wireless communication device receiving a remote device signal at the $N^{th}$ timing; and
   (g) the wireless communication device cancelling the estimated self-interference signal with the remote device signal to generate an interference cancellation signal.

6. A wireless communication device for use in a Full Duplex Radio (FDR) network system, comprising:
   a transceiver, being configured to:
      receive a first self-interference signal at a first timing;
      receive a second self-interference signal at a second timing and generate a first ideal transmitting signal; and
      receive a third self-interference signal at a third timing and generate a second ideal transmitting signal;
   a processor, being configured to:
      calculate a signal adjusting vector according to the first self-interference signal, the second self-interference signal, the third self-interference signal, the first ideal transmitting signal and the second ideal transmitting signal;
   wherein the transceiver is further configured to generate a third ideal transmitting signal and receive a remote device signal at a fourth timing, and the processor is further configured to calculate a fourth self-interference signal corresponding to the third self-interference signal and the third ideal transmitting signal based on the signal adjusting vector; and wherein the processor is further configured to cancel the fourth self-interference signal with the remote device signal to generate an interference cancellation signal.

7. The wireless communication device according to claim 6, wherein the second self-interference signal is a product of a matrix, which is formed by the first self-interference signal and the first ideal transmitting signal, and the signal adjusting vector, and the third self-interference signal is a product of a matrix, which is formed by the second self-interference signal and the second ideal transmitting signal, and the signal adjusting vector.

8. The wireless communication device according to claim 6, wherein the transceiver is further configured to generate the third ideal transmitting signal at the fourth timing, and the processor is further configured to generate the fourth self-interference signal by multiplying a matrix, which is formed by the third self-interference signal and the third ideal transmitting signal, with the signal adjusting vector.

9. A wireless communication device for use in a Full Duplex Radio (FDR) network system, comprising:
  a transceiver, being configured to, at a plurality of timings respectively, receive a plurality of self-interference signals and generate a plurality of ideal transmitting signals;
  a processor, being configured to:
    create an M×M self-interference signal reference matrix $\Phi$ in the following form according to the self-interference signals and the ideal transmitting signals:

$$\begin{bmatrix} Y(1) & Y(2) & \ldots & Y(m-1) & X(m) \\ Y(2) & Y(3) & \ldots & Y(m) & X(m+1) \\ \vdots & \vdots & \ddots & \vdots & \vdots \\ Y(m-1) & Y(m) & \ldots & Y(2m-3) & X(2m-2) \\ Y(m) & Y(m+1) & \ldots & Y(2m-2) & X(2m-1) \end{bmatrix}$$

and create an M×1 self-interference signal matrix K in the following form according to the self-interference signals:

$$\begin{bmatrix} Y(m) \\ Y(m+1) \\ \vdots \\ Y(2m-2) \\ Y(2m-1) \end{bmatrix}$$

where, m is a positive integer greater than 1, $Y(T)$ represents a self-interference signal received at a $T^{th}$ timing, and $X(T)$ represents an ideal transmitting signal generated at the $T^{th}$ timing;

calculate a signal adjusting vector matrix v according to the M×M self-interference signal reference matrix $\Phi$ and the M×1 self-interference signal matrix K, where, $v=(\Phi^T\Phi)^{-1}\Phi^T K$ calculate an estimated interference signal at an $N^{th}$ timing according to the following formula:

$$Y(N,v)=[Y(N-(m-1))\ldots Y(N-1)X(N)]\times v$$

where, $Y(N,v)$ is the estimated interference signal, $Y(T)$ represents a self-interference signal received at a $T^{th}$ timing, and $X(T)$ represents an ideal transmitting signal generated at the $T^{th}$ timing.

10. The wireless communication device according to claim 9, wherein the transceiver is further configured to receive a remote device signal at the $N^{th}$ timing, and the processor is further configured to cancel the estimated self-interference signal with the remote device signal to generate an interference cancellation signal.

* * * * *